(12) United States Patent
Iki (10) Patent No.: US 8,879,034 B2
(45) Date of Patent: Nov. 4, 2014

(54) ELECTRO-OPTICAL DEVICE, MANUFACTURING METHOD OF THE SAME, AND ELECTRONIC APPARATUS

(75) Inventor: Takunori Iki, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 855 days.

(21) Appl. No.: 12/568,788

(22) Filed: Sep. 29, 2009

(65) Prior Publication Data

US 2010/0079715 A1    Apr. 1, 2010

(30) Foreign Application Priority Data

Sep. 30, 2008  (JP) .................................. 2008-252535

(51) Int. Cl.
*G02F 1/1333* (2006.01)
*G02F 1/1343* (2006.01)
*G02F 1/1335* (2006.01)

(52) U.S. Cl.
CPC  *G02F 1/13439* (2013.01); *G02F 2001/133565* (2013.01); *G02F 1/133345* (2013.01); *G02F 1/133504* (2013.01)
USPC .............................. 349/138; 349/38; 349/143

(58) Field of Classification Search
CPC .................... G02F 1/133345; G02F 1/136213
USPC ................... 349/138, 38, 139, 143, 146, 147
See application file for complete search history.

(56) References Cited

U.S. PATENT DOCUMENTS

| 6,563,559 | B2 * | 5/2003 | Noritake ........................ 349/113 |
| 6,882,105 | B2 * | 4/2005 | Murakami et al. ............ 313/506 |
| 6,924,876 | B2 * | 8/2005 | Kubo et al. .................... 349/193 |
| 7,133,094 | B2 * | 11/2006 | Ogawa et al. .................. 349/114 |
| 7,158,103 | B2 * | 1/2007 | Nakanishi ........................ 345/76 |
| 7,245,343 | B2 | 7/2007 | Suzuki et al. |
| 7,385,660 | B2 | 6/2008 | Kume et al. |
| 7,468,765 | B2 * | 12/2008 | Shiota et al. ................... 349/110 |
| 7,701,538 | B2 | 4/2010 | Kume et al. |
| 7,705,943 | B2 | 4/2010 | Kume et al. |

FOREIGN PATENT DOCUMENTS

| JP | 06-148684 | 5/1994 |
| JP | 06-148684 A | 5/1994 |
| JP | 2001-343647 A | 12/2001 |
| JP | 2002-287158 A | 10/2002 |
| JP | 2005-062387 A | 3/2005 |
| JP | 2005-242127 A | 9/2005 |

* cited by examiner

*Primary Examiner* — Bumsuk Won
*Assistant Examiner* — Paisley L Arendt
(74) *Attorney, Agent, or Firm* — Maschoff Brennan (57) ABSTRACT

An electro-optical device includes an insulating film having a tilted face, the tilted face sloping down toward inside of an opening area of a pixel arranged in a pixel area in plan view, and a pixel electrode that is disposed in the pixel on an upper layer side relative to the insulating film and is formed so as to include at least an area that overlaps the tilted face of the insulating film in plan view.

8 Claims, 9 Drawing Sheets

ELECTRO-OPTICAL DEVICE, MANUFACTURING METHOD OF THE SAME, AND ELECTRONIC APPARATUS

BACKGROUND

1. Technical Field

The present invention relates to the technical fields of an electro-optical device such as a liquid crystal device and an electronic apparatus such as a liquid crystal projector that includes the electro-optical device.

2. Related Art

In electro-optical devices of this type, active matrix driving can be performed by arranging a pixel electrode, a scanning line that is used for selective driving of the pixel electrode, a data line, and a TFT (thin film transistor) as a pixel switching element on a substrate. Here, in the active matrix driving, the operation of the TFT is controlled by supplying a scanning signal to the scanning line, and an image signal is supplied to the data line at a time when the TFT is driven to be in the ON state, whereby image display is achieved. In such electro-optical devices, there are cases where an accumulation capacitor is arranged between the TFT and the pixel electrode for achieving high contrast of a displayed image or the like. In addition, when light is projected onto the TFT, the TFT used as a switching element may perform an improper operation due to the generation of an optical leakage current and flickers can be generated in the displayed image.

In JP-A-6-148684, technology has been disclosed for suppressing the optical leakage current of the TFT by forming a light shielding film on the periphery of the TFT while an aperture ratio (that is, the ratio of an opening area to the total area acquired by summing the opening area and a non-opening area of each pixel) is acquired by configuring one pair of transparent electrodes that face each other through a capacitor insulating film.

However, according to the above-described technology, a light shielding film that has a complicated stacked structure needs to be formed for shielding the light incident onto the semiconductor layer of the TFT. Accordingly, there is a problem that the layout of the stacked structure, such as the wiring that is used for performing an electro-optical operation, is significantly limited. Thus, the above-described technology cannot be easily applied to a liquid crystal device or the like that is required to have high definition as a general requirement. In addition, in order to form the complicated stacked structure, many manufacturing processes need to be performed, whereby there is a problem that the manufacturing cost is increased.

SUMMARY

An advantage of some aspects of the invention is that it provides an electro-optical device capable of suppressing the generation of an optical leakage current and responding to a requirement for high definition without complicating the stacked structure, a manufacturing method thereof, and an electronic apparatus having the electro-optical device.

According to an aspect of the invention, there is provided a electro-optical device including: an insulating film that is formed to have a film thickness which is smaller in a first area located close to the center of the opening area of each pixel arranged in a pixel area compared to another area that is located on the periphery of the first area, and has a tilted face that is tilted at an angle with respect to the first area and the other area in a boundary area interposed between the first area and the other area on the surface thereof; and a plurality of pixel electrodes that is disposed in the each pixel on the upper layer side relative to the insulating film and is formed so as to include at least an area of the insulating film that overlaps the tilted face on the substrate in the plan view. The insulating film and the plurality of pixel electrodes are formed on a substrate.

According to the above-described electro-optical device, a circuit for driving a pixel electrode is configured by stacking wirings such as a scanning line or a data line, or an electronic element such as a pixel switching TFT are stacked as needed while being insulated from one another by insulating films. A "pixel area" according to an embodiment of the invention means a pixel array area (typically, also referred to as an "image displaying area") and is configured by arranging a plurality of pixels. In each pixel, the first area is located near the center of the opening area (that is, the area out of the entire area of each pixel in which transmitted light, reflected light or the like that actually contributes to the display is output). On the other hand, the other area is located on the periphery of the first area. In addition, the non-opening area (that is, the area in which light such as transmitted light, reflected light, or the like that actually contributes to display is not output) is located between the opening areas in the plan view.

When the electro-optical device is operated, an image signal is supplied to the pixel electrode through the data line, for example, at a time corresponding to the ON or OFF operation of the pixel switching TFT. Accordingly, an image can be displayed in the pixel area in which a plurality of pixel electrodes is arranged.

The insulating film is formed to have a film thickness which is smaller in the first area that is located close to the center of the opening area than that in the other area that is located on the periphery of the opening area. In other words, the insulating film is formed such that the film thickness is smaller in a specific area of the opening area in which display light is transmitted on the substrate in the plan view. In addition, a boundary area is interposed between the first area and the other area, and a tilted face that is tilted at an angle with respect to the first area and the other area is formed in the boundary area. In other words, when focusing on one specific pixel, the surface of the insulating film on the substrate in the plan view is formed to have a bowl shape that uses the first area as a bottom portion.

The pixel electrode is formed on the insulating film so as to correspond with each pixel. In particular, each pixel electrode is formed to include at least the tilted face of the surface of the insulating film on the substrate in the plan view. Accordingly, a shape corresponding to a concave shape of the bowl shape of the insulating film is also formed on the surface of the pixel electrode.

When the tilted face is formed in a part of the surface of the insulating film and the surface of the pixel electrode, the light penetrated at an angle with respect to the substrate is refracted by the tilted face. Alternatively, in addition to or instead of the tilted face, light is reflected toward a position near to the center by the inner face of the concave portion of the bowl shape. As a result, light incident at an angle with respect to the substrate can be prevented from penetrating the non-opening area. When the tilted face is not arranged, a part of the light penetrated into the opening area at an angle is projected, for example, to the switching TFT of the pixel electrode that is disposed in the non-opening area, and the TFT performs an improper operation due to generation of the optical leakage current. On that point, by forming the pixel electrode and the insulating film to have the tilted face as in the above-described electro-optical device, the direction of light incident travelling at an angle can be refracted so as to approach a direction perpendicular to the substrate. As a result, the tilted light which penetrates into the non-opening area can be decreased, and generation of the optical leakage current in the TFT as described above can be suppressed.

In addition, in a typical electro-optical device in which tilted faces are not arranged in the insulating film, the tilted light incident to the non-opening area disappears or is reflected in the non-opening area without contributing to the transmittance of the electro-optical device. However, according to the above-described electro-optical device, by refracting light which would penetrate into the non-display area, the light can be used for image display as a part of the transmitted light. Accordingly, an electro-optical device having higher transmittance can be achieved compared to a typical electro-optical device.

As described above, according to the above-described electro-optical device, by arranging the tilted face in the insulating film, penetration of the tilted light into the non-opening area can be prevented. In addition, by constructively utilizing the tilted light refracted by the tilted face as display light, an electro-optical device with superior transmittance can be achieved.

In the electro-optical device of the invention, the tilted face is a curved face with a predetermined curvature.

In such a case, the tilted face that is formed on the surface of the insulating film does not need to be a planar tilted shape tilted in a predetermined direction and may be a curved face. Here, "having a predetermined curvature" means not only a curved face with a predetermined curvature but also a curved face with a plurality of curvatures, for example, two or more types of curvatures depending on the area, and means that inclusion of a curved face with any arbitrary curvature is sufficient. For example, the tilted face may be a curved face with a constant curvature, that is, a curved face in which the cross section of the tilted face becomes a part of a spherical shape. In addition, the tilted face may be configured by combining curved faces that have two or more curvatures for each area.

In addition, when the direction of the incident light travelling to the substrate can be determined in advance, the travelling direction of the refracted tilted light is adjusted so as to be more effectively close to the direction which is perpendicular to the substrate by setting the curvature of the tilted face or an angle with respect to the substrate in accordance with the penetration angle of the incident light.

In the electro-optical device of the invention, the tilted face is formed on the substrate along the edge portion of the opening area in the plan view.

In such a case, the penetration of the tilted light into the non-opening area can be prevented more effectively by forming the tilted face along the edge portion of the opening area, that is, the area of the opening area located near the non-opening area. As described above, in the non-opening area, for example, the switching transistor of the pixel electrode and the like are disposed. Accordingly, penetration of the tilted light needs to be prevented to suppress the generation of the optical leakage current. Thus, by forming the insulating film such that the tilted face is disposed in the edge portion of the opening area that is an area of the opening area located close to the non-opening area, same as in this aspect, the light shielding characteristic of the non-display area can be improved.

In the electro-optical device of the invention, the insulating film is formed so as to include material having a refractive index that is different from that of the pixel electrode.

In such a case, the insulating film having the tilted face and the pixel electrode formed on the upper side has different refractive indices. Accordingly, the tilted light is refracted based on the difference of the refractive indices. In addition, the refraction angle of the tilted light can be controlled by adjusting the refractive indices of the materials forming the insulating film and the pixel electrode. The refraction angle of the tilted light incident at various angles can be adjusted by selecting the refractive indices of the materials forming the insulating film and the pixel electrode as described above. Accordingly, the travelling direction of the refracted tilted light can be controlled more effectively, and therefore, the tilted light penetrating into the non-opening area can be reduced further.

In the electro-optical device of the invention, the electro-optical device further includes a thin film transistor that controls the switching of the pixel electrode in the non-opening area located in the gaps between the opening areas in the pixel area.

In such a case, in the operation of the electro-optical device, a thin film transistor is included that is used for controlling the switching, for example, for supplying an image signal to the pixel electrode at a predetermined timing. In such a thin film transistor, when light is projected onto the semiconductor layer, the TFT performs an improper operation or the like due to an increase in the optical leakage. Accordingly, the TFT is typically disposed in the non-opening area. As described above, by arranging the insulating film having the tilted face, penetration of the incident light into the non-opening area can be suppressed. Accordingly, an increase in the optical leakage current in the TFT that is disposed in the non-opening area can be prevented. As a result, the improper operation of the TFT and the like can be suppressed, and an electro-optical device can be implemented which has a high quality displayed image in which flickers and the like are decreased.

In the electro-optical device of the invention, the electro-optical device further includes a conductive layer that is formed on the lower layer side relative to the insulating film and is configured from at least some out of a wiring, an electrode, and an electronic element that are used for performing an electro-optical operation in the pixel area.

In such a case, the conductive layer is formed on the lower layer side of the pixel electrode and is formed at least as a part of a wiring, an electrode, and an electronic element for performing an electro-optical operation in the pixel area. For example, the conductive layer may be configured as one out of the two capacitor electrodes, which forms one pair, configuring an additional capacitor for achieving high contrast. Alternatively, a shield layer or the like that shields the electric fields that are generated between conductive layers having different electric potentials may be configured as the conductive layer.

In the electro-optical device of the invention, both the pixel electrode and the conductive layer are formed to include ITO (indium tin oxide).

In such a case, ITO is a conductive material having transparency, and accordingly, by using the ITO for the pixel electrode disposed for each pixel or the conductive layer that is formed on the lower layer side of the pixel electrode, excellent signal transfer can be realized without decreasing the transmittance of the electro-optical device. Accordingly, by using ITO for the conductive layer, an electro-optical device that has high transmittance and can perform image display with high quality can be achieved.

In addition, ITO has a relatively large resistance value, compared to metal materials such as aluminum. Thus, in such a case, it is preferable that the conductive layer formed of ITO is formed as an element which does not require a high-speed operation or the like. For example, as described above, the capacitor electrode or the shield layer to which a fixed electric potential is applied may be formed from a conductive material.

In the electro-optical device of the invention, the insulating film is partially removed in the first area, and an accumulation capacitor is formed by disposing the pixel electrode and the conductive layer so as to face each other through a capacitor insulating film.

In such a case, in the electro-optical device, the pixel electrode and the conductive layer are formed as one pair of the capacitor electrodes, and the holding capacitor acquired by pinching an insulating film between the pixel electrode and the conductive layer is formed. For example, by supplying a fixed electric potential to the conductive layer formed on the lower side of the pixel electrode from a power line or the like, the holding capacitor can be formed that is connected to the pixel electrode to which an image signal is supplied. Accordingly, for example, the holding capacitance is added to the wiring capacitance of the wiring to which an image signal is applied or capacitance generated due to overlapping of the wiring and another wiring. Therefore, the occurrence of variation in electric potential from what the original image signal is suppose to have, that is, the occurrence of push-down in the electric potential of the image signal written into the pixel electrode can be suppressed. As a result, the occurrence of uneven display along the data lines due to push-down of the electric potential of the image signal written into the pixel electrode can be decreased or prevented.

In the electro-optical device of the invention, the first area has a polygon shape on the substrate in the plan view.

In such a case, the first area of the insulating film has a polygon shape, and thus, the boundary area interposed between the first area and the other area, that is, the tilted face also is formed in the polygon shape. When the tilted face is configured in the polygon shape, penetration of light into the non-opening area can be prevented by refracting light incident at angles from various directions. For example, when there is light which would be incident at angles from three directions, the tilted face is formed in a triangular shape, and the sides of the triangular shape are formed so as to perpendicularly intersect the incident directions of the light in three directions. As described above, when light is incident at an angle simultaneously from a plurality of directions, by forming the first area in a polygon shape corresponding to the number of directions of penetration of the incident light, the penetration of the tilted light into the non-opening area can more effectively be prevented.

In the electro-optical device of the invention, the first has a circular shape on the substrate in the plan view.

In such a case, as the number of directions of penetration of incident light is increased, the number of the sides of the first area formed in the polygon shape is increased. Here, the "circular shape" described here is a shape not having a polygon-shaped outer periphery but having a smooth outer periphery and includes not only a circular shape but also an oval shape. As described above, in order to cope with the tilted light incident from more directions, the first area of the insulating film is formed in a circular shape. The circular shape is equivalent to a case where the number of the sides of a polygon is increased infinitely. Thus, by forming the first area in a circular shape, penetration of tilted light incident which would be at angles from every direction into the non-opening area can be prevented.

According to an another aspect of the invention, there is provided a method of manufacturing the electro-optical device, including: forming the conductive layer that configures at least a part of a wiring, an electrode, and an electronic element that are used for performing an electro-optical operation in the pixel area on the substrate; forming the insulating film on the upper layer side of the conductive layer; patterning the insulating film such that the film thickness of the insulating film in the first area is smaller than that in the other area and such that the insulating film has a tilted face tilted at an angle with respect to the first area and the other area on the surface thereof in a boundary area interposed between the first area and the other area; and forming a pixel electrode for each pixel, on the upper layer side of the insulating film, so as to include at least an area of the insulating film that overlaps the tilted face of the insulating film on the substrate in the plan view.

According to the above-described manufacturing method, as described above, the insulating film that prevents penetration of the tilted light into the non-opening area, first, is formed to be flat on the conductive layer formed on the substrate and then, is patterned, and thereby the tilted face is formed on the surface thereof.

In the above-described manufacturing method, the surface of the insulating film that is formed in the forming of the insulating film may be partially removed by performing wet etching in the patterning of the insulating film.

In such a case, the surface of the insulating film is processed by using not dry etching that is typically used for patterning wiring, elements or the like but wet etching, and thereby the surface structure such as the tilted face is formed. When dry etching is used, the depth of etching is large, and it is technically difficult to form a curved face with a predetermined curvature on the surface. Accordingly, by using wet etching in this case, the above-described various structures can be formed on the surface of the insulating film.

According to a third aspect of the invention, there is provided an electronic apparatus that includes the above-described electro-optical device (including various forms).

According to the above-described electronic apparatus, the above-described electro-optical device is included. Therefore, various electronic apparatuses such as a transmission-type display apparatus, a television set, a cellular phone, an electronic organizer, a word processor, a view-finder-type or monitor-direct-viewing-type video cassette recorder, a workstation, a video phone, a POS terminal, and a touch panel, that are capable of displaying an image with high quality can be realized. In addition, as the above-described electronic apparatus, for example, an electrophoretic device such as electronic paper can be realized.

The operation and other advantages of the invention become apparent from descriptions below.

BRIEF DESCRIPTION OF THE DRAWINGS

The invention will be described with reference to the accompanying drawings, wherein like numbers reference like elements.

DESCRIPTION OF EXEMPLARY EMBODIMENTS 1-1. Liquid Crystal Device

First, the whole configuration of a liquid crystal device according to an embodiment of the invention will be described with reference to FIGS. 1 and 2.

Figure 1:
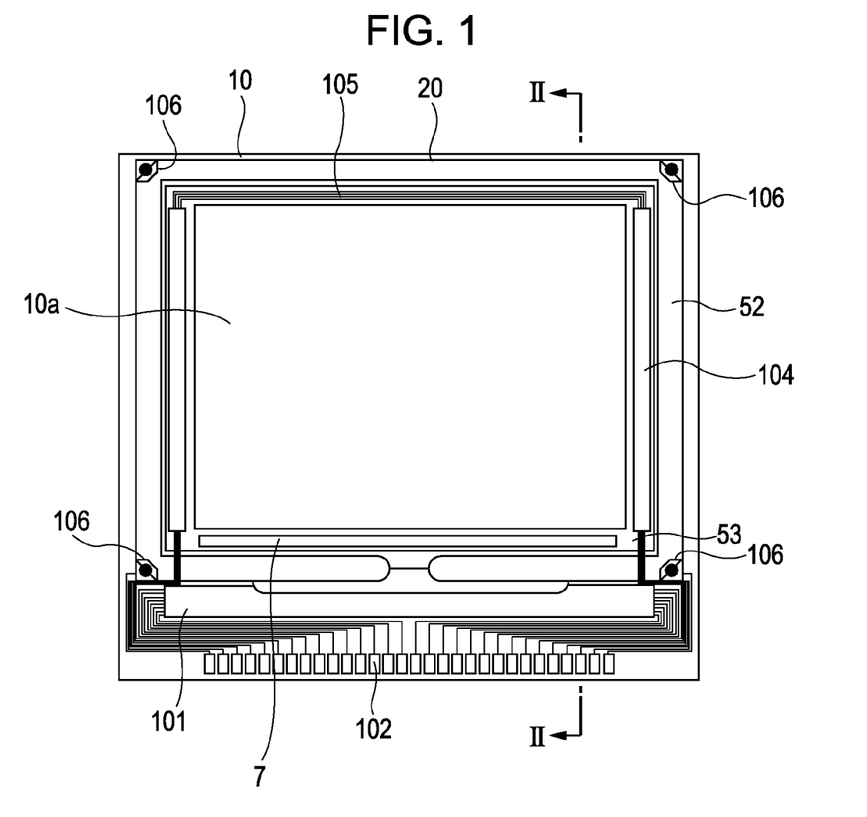
FIG. 1 is a plan view of a liquid crystal device according to an embodiment of the invention.

FIG. 1 is a schematic plan view showing the configuration of the liquid crystal device viewed from the opposing plate 20 side together with constituent elements formed on the TFT array substrate 10. FIG. 2 is a cross-sectional view taken along line II-II shown in FIG. 1.

Figure 2:
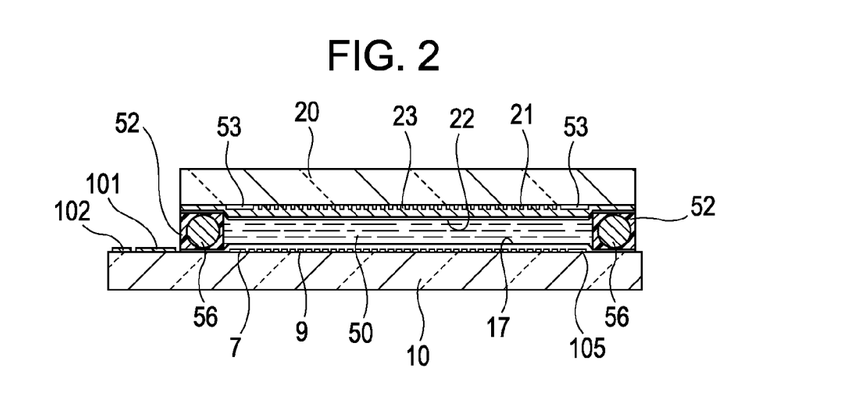
FIG. 2 is a cross-sectional view taken along line II-II shown in FIG. 1.

As shown in FIGS. 1 and 2, the liquid crystal device according to this embodiment includes a TFT array substrate 10 and an opposing substrate 20 which are disposed so as to face each other. The TFT array substrate 10, for example, is a transparent substrate such as a quartz substrate, a glass substrate or a silicon substrate. The opposing substrate 20, for example, is a substrate that is formed from the same material as that of the TFT array substrate 10. Between the TFT array substrate 10 and the opposing substrate 20, a liquid crystal layer 50 is enclosed. The TFT array substrate 10 and the opposing substrate 20 are bonded together by a sealing member 52 disposed in a sealing area that is located on the periphery of an image displaying area 10a in which an electro-optical operation is performed.

The sealing member 52 is formed from, for example, an ultraviolet curing resin, a thermoset resin, or the like for bonding both the substrates. In the manufacturing process, the sealing member 52 is coated on the TFT array substrate 10 and then is cured by irradiation of an ultraviolet ray, heating or the like. In addition, in order to create a constant gap (inter-substrate gap) between the TFT array substrate 10 and the opposing substrate 20, gap members 56 such as, for example, glass fibers or glass beads are dispersed in the sealing member 52.

A frame light-shielding film 53 having a light shielding property which defines the frame area of the image displaying area 10a is disposed on the opposing substrate 20 side, in parallel with the inner side of the sealing area in which the sealing members 52 are disposed. However, a part or the whole of the frame light-shielding film 53 may be arranged on the TFT array substrate 10 side as a built-in light shielding film.

In a peripheral area that is located on the periphery of the image displaying area 10a formed on the TFT array substrate 10, a data line driving circuit 101, a sampling circuit 7, scanning line driving circuits 104, and external circuit connecting terminals 102 are formed.

On the outer periphery side in the peripheral area formed on the TFT array substrate 10 relative to the sealing area, the data line driving circuit 101 and a plurality of the external circuit connecting terminals 102 are disposed along one side of the TFT array substrate 10.

In addition, in an area located on the inner side of the sealing area in the peripheral area formed on the TFT array substrate 10, the sampling circuit 7 is disposed along one side of the image displaying area 10a that follows one side of the TFT array substrate 10 and is covered with the frame light-shielding film 53.

In addition, the scanning line driving circuits 104 are disposed along two sides adjacent to the above-described one side of the TFT array substrate 10 and are covered with the frame light-shielding film 53. In order to electrically connect the two scanning line driving circuits 104 that are arranged on both sides of the image displaying area 10a, a plurality of wirings 105 is arranged along the remaining one side of the TFT array substrate 10 and is covered with the frame light-shielding film 53.

In addition, vertical conduction terminals 106 are disposed so as to face four corner portions of the opposing substrate 20 in areas in the peripheral area which is formed on the TFT array substrate 10. In addition, a vertical conduction member is arranged between the TFT array substrate 10 and the opposing substrate 20 so as to correspond with each of the vertical conduction terminals 106 and be electrically connected to the vertical conduction terminals 106.

As shown in FIG. 2, a stacked structure, in which wirings such as pixel switching TFTs, the scanning lines, and the data lines are formed, is formed on the TFT array substrate 10. In the image displaying area 10a, pixel electrodes 9 are arranged in a matrix shape on the upper layer of the wirings such as the pixel switching TFTs, the scanning lines, and the data lines. The pixel electrode 9 is formed as a transparent electrode that is formed from an ITO film. An alignment film 17 is formed on the pixel electrode 9.

On the other hand, a light shielding film 23 is formed on the face of the opposing substrate 20 that faces the TFT array substrate 10. The light shielding film 23, for example, is configured by a light-shielding metallic film or the like. The light shielding film 23, for example, is patterned in a lattice shape within the image displaying area 10a formed on the opposing substrate 20. In addition, on the light shielding film 23 (the lower side relative to the light shielding film 23 in FIG. 2), an opposing electrode 21 that is configured by an ITO film, for example, is formed in the shape being spread on the whole face so as to face a plurality of pixel electrodes 9. In addition, an alignment film 22 is formed on the opposing electrode 21 (the lower side relative to the opposing electrode 21 in FIG. 2).

The liquid crystal layer 50, for example, is formed from one type of nematic liquid crystals or liquid crystals acquired by mixing several types of nematic liquid crystals. The liquid crystal layer 50 forms a predetermined aligning state between one pair of the alignment films. By applying a voltage between the pixel electrode 9 and the opposing electrode 21 when driving the liquid crystal device, a liquid crystal holding capacitor is formed between the pixel electrode 9 and the opposing electrode 21.

Although not shown in the figure, a precharge circuit that supplies a precharge signal of a predetermined voltage level to a plurality of the data lines prior to an image signal, a test circuit that is used for testing the quality, defects, or the like of the liquid crystal device in the process of manufacturing or at the time of shipment and the like may be formed on the TFT array substrate 10, in addition to the data line driving circuit 101 and the scanning line driving circuits 104.

Figure 3:
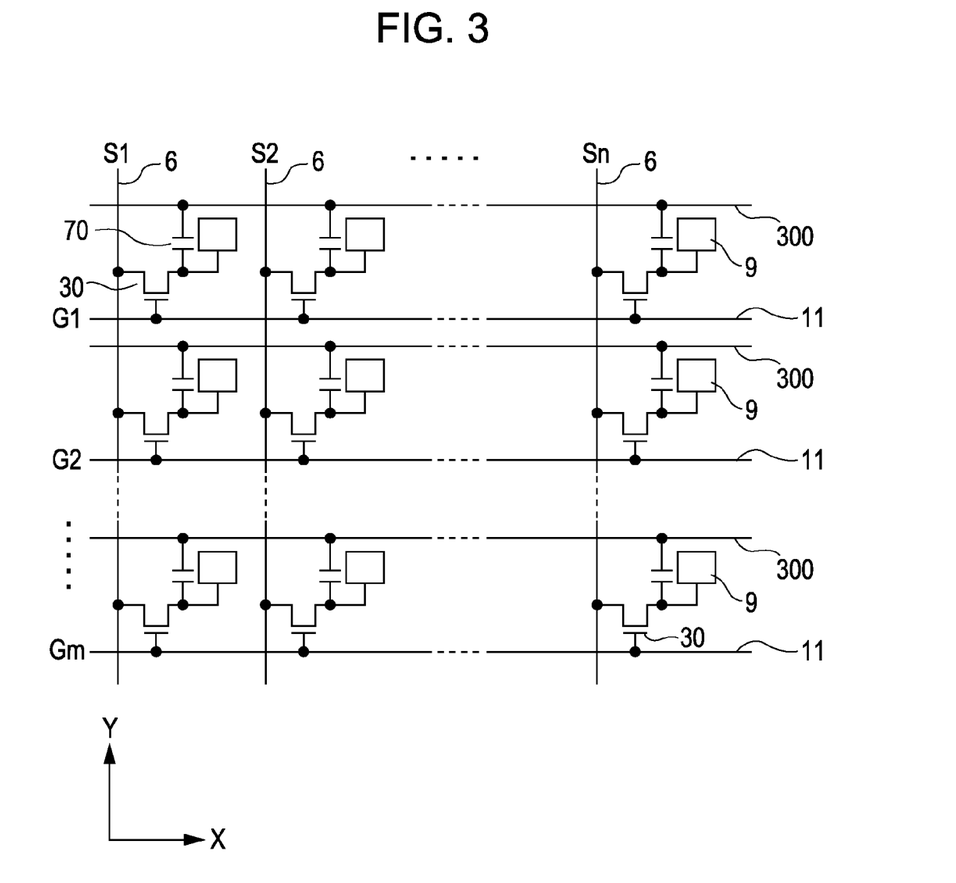
FIG. 3 is a circuit diagram showing the electrical configuration of a liquid crystal device according to the embodiment.

Next, the electrical configuration of the image displaying area of the liquid crystal device according to this embodiment will be described with reference to FIG. 3. FIG. 3 is an equivalent circuit diagram of various elements, wirings and the like from a plurality of pixels formed in a matrix shape that configures the image displaying area of the liquid crystal device according to this embodiment.

As shown in FIG. 3, in each of the plurality of pixels formed in the matrix shape that configures the image displaying area 10a, a pixel electrode 9 and a pixel switching TFT 30 are formed as an example of a "transistor" according to an embodiment of the invention. The TFT 30 is electrically connected to the pixel electrode 9 and controls the switching of the pixel electrode 9 for cases where the liquid crystal device according to this embodiment is operated. The data line 6 to which the image signal is supplied is electrically connected to the source region of the TFT 30. The image signals S1, S2, . . . , Sn that are written into the data lines 6 may be supplied in a line sequential manner in the mentioned order or may be configured to be supplied to each group of a plurality of data lines 6 that are positioned adjacently.

The scanning line 11 is electrically connected to the gate of the TFT 30. The liquid crystal device according to this embodiment is configured such that scanning signals G1, G2, . . . , Gm are applied as pulses to the scanning lines 11 in the mentioned order in the line sequential manner at predetermined times. The pixel electrode 9 is electrically connected to the drain of the TFT 30. By closing the switch of the TFT 30 used as a switching element only for a predetermined period, the image signals S1, S2, . . . , Sn that are supplied from the data lines 6 are written into the pixel electrodes 9 at predetermined times. The image signals S1, S2, . . . , Sn of a predetermined level that are written into the liquid crystals through the pixel electrodes 9 are maintained for a predetermined time period between the liquid crystals and the opposing electrodes 21 (see FIG. 2) formed on the opposing electrode 20 (see FIG. 2).

The liquid crystals that configure the liquid crystal layer 50 (see FIG. 2) modulate light by changing the alignment or order of a molecular set based on an applied voltage level and implements the display of gray scales. In the normally-white mode, the transmittance for incident light is decreased in accordance with a voltage that is applied to each unit of pixels. On the other hand, in the normally-black mode, the transmittance for the incident light is increased in accordance with a voltage that is applied to each unit of pixels. As a result, light that has contrast on the basis of the image signal is emitted from the liquid crystal device as a whole.

Here, in order to prevent leakage of the maintained image signal, an accumulation capacitor 70 is added electrically in parallel with the liquid crystal capacitor that is formed between the pixel electrode 9 and the opposing electrode 21 (see FIG. 2).

Next, a specific stacked structure of the image displaying area 10a of the liquid crystal device according to this embodiment will be described in detail.

Figure 4:
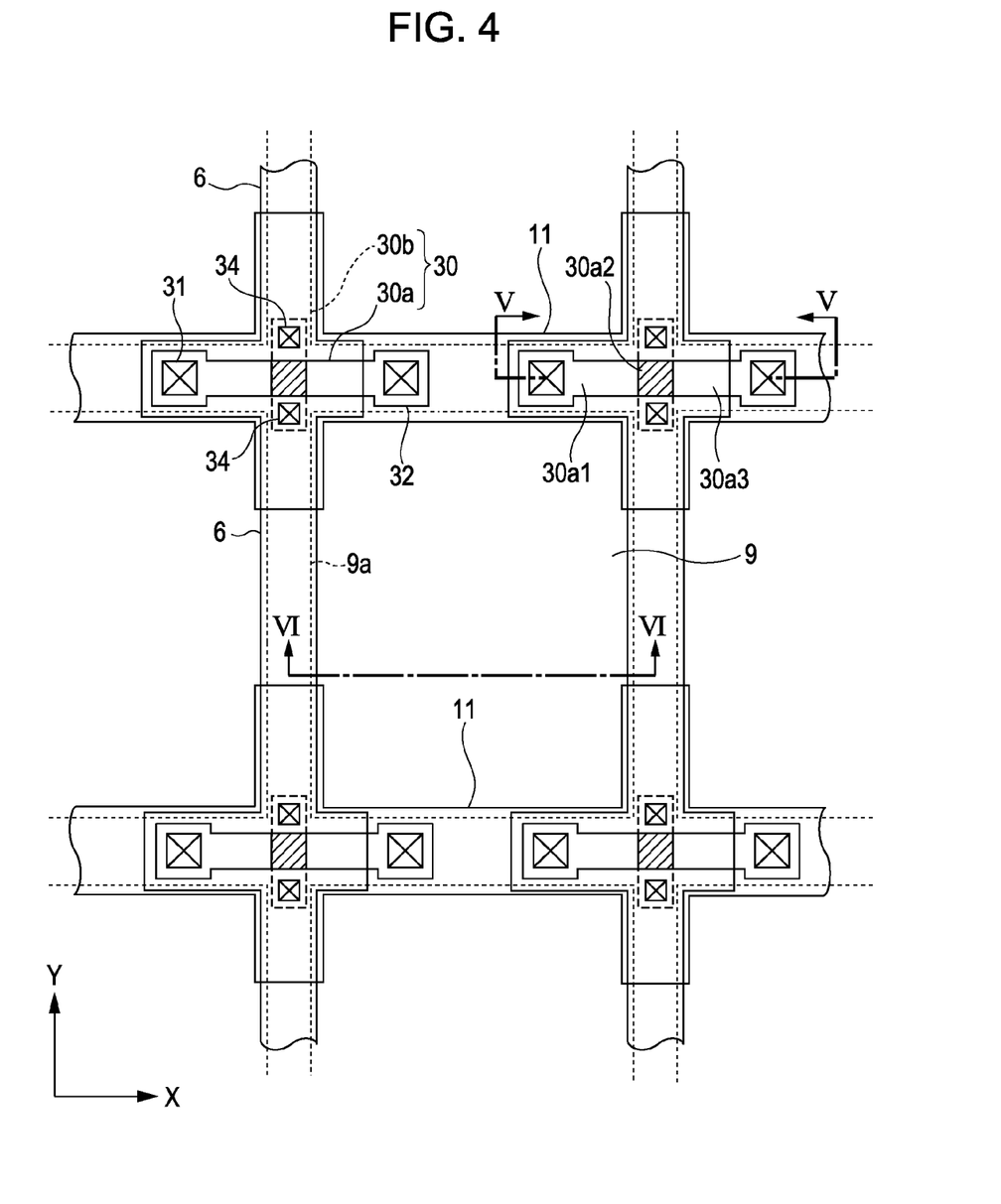
FIG. 4 is a schematic diagram showing the positional relationship of wirings and the like formed in an image displaying area of a liquid crystal device according to the embodiment in a transmissive manner.

FIG. 4 is a schematic diagram which transparently shows the positional relationship of electrodes, wirings and the like which are disposed in the image displaying area 10a in the liquid crystal device according to this embodiment for the performing of an electro-optical operation. In FIG. 4, in order to size the layers and the members so as to be recognizable in the figure, the measurements of each of the layers and members may be differently set.

The scanning lines 11 and the data lines 6 are disposed along direction X and direction Y on the TFT array substrate 10. In addition, the TFT 30 (that is, a semiconductor layer 30a and a gate electrode 30b) is formed near the intersection of each data line 6 and each scanning line 11. The scanning lines 11, for example, are formed from a conductive material such as W, Ti, or TiN that has the light shielding property. In addition, the scanning line 11 is formed to be broader than the semiconductor layer 30a in the TFT 30 so as to include the semiconductor layer 30a. Here, as described below, the scanning line 11 is disposed on the lower layer side relative to the semiconductor layer 30a. Accordingly, by forming the scanning line 11 to be broader than the semiconductor layer 30a of the TFT 30 as described above, the channel region 30b of the TFT 30 can be shielded mostly or completely for returned light including light reflected from the rear side of the TFT array substrate 10, light that is generated from a different liquid crystal device and is transmitted through a composed optical system in a multiple plate-type projector, or the like. As a result, when the liquid crystal device is operated, the optical leakage current in the TFT 30 is decreased, and the contrast ratio can be improved, whereby image display with high quality can be achieved.

The TFT 30 is configured from the semiconductor layer 30a and the gate electrode 30b. The semiconductor layer 30a is formed to include a source region 30a1, a channel region 30a2, and a drain region 30a3. Here, an LDD (lightly doped drain) region may be formed on the boundary face of the channel region 30a2 and the source region 30a1 or the channel region 30a2 and the drain region 30a3.

The gate electrode 30b is formed through a gate insulating film in an area on the TFT array substrate 10 that overlaps the channel region of the semiconductor layer 30a in the plan view. In addition, the gate electrode 30b is electrically connected to the scanning line 11 that is disposed on the lower layer side through a contact hole 34, and controls the ON/OFF of the TFT 30 in accordance with application of a scanning signal.

The source region 30a1 of the TFT 30 is electrically connected to the data line 6 through a contact hole 31. On the other hand, the drain region 30a3 in the TFT 30 is electrically connected to the pixel electrode 9 that is formed on the upper layer side through a drain relay wiring (not shown in FIG. 4) that is formed in a contact hole 32.

The pixel electrode 9 is formed in an island shape for each pixel. According to this embodiment, the pixel electrodes 11 are partitioned in a matrix shape by the data lines 6 and the scanning lines 11. As denoted by a dotted line 9a shown in FIG. 4, the pixel electrode 9 is disposed for each pixel such that the edge portion of the pixel electrode 9 partially overlaps with the data line 6 and the scanning line 11 on the TFT array substrate 10 in the plan view.

Figure 5:
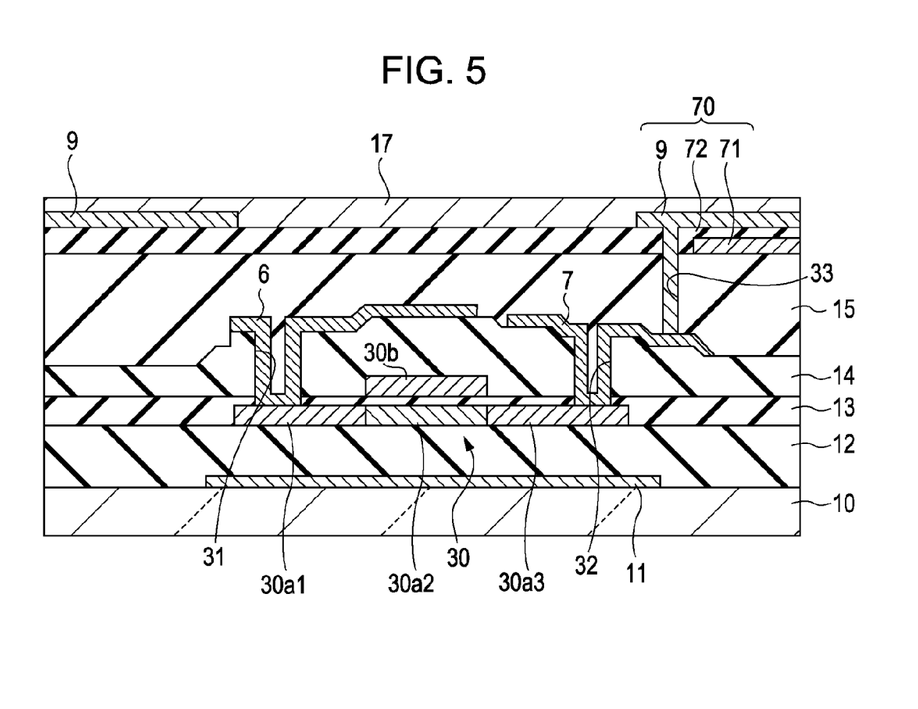
FIG. 5 is a cross-sectional view taken along line V-V shown in FIG. 4.

Subsequently, the stacked structure of a cross section taken along line V-V shown in FIG. 4 will be described with reference to FIG. 5. On the TFT array substrate 10, the above-described scanning line 11 is formed to have a width larger than that of the semiconductor layer 30a in the TFT 30 that is formed on the upper layer side. The scanning line 11 is covered with an underlying insulating film 12. In addition, the underlying insulating film 12 also has a function of preventing a change in the characteristics of the pixel switching TFT 30 due to damage at the time of surface polishing of the TFT array substrate 10, dirt remaining after cleaning or the like.

The TFT 30 is configured by the semiconductor layer 30a (the source region 30a1, the channel region 30a2, and the drain region 30a3) and the gate electrode 30b. In particular, the gate electrode 30b, for example, is formed from conductive poly-silicon and is electrically connected to the scanning line 11 that is disposed on the lower layer side.

The data line 6 to which an image signal is supplied is electrically connected to the source region 30a1 through the gate insulating film 13 and the contact hole 31 that is open in a first interlayer insulating film 14. On the other hand, the drain region 30a3 is electrically connected to the pixel electrode 9, which is formed on the upper layer side, through the drain relay wiring 7. In particular, the drain relay wiring 7 electrically connects the drain region 30a3 and the pixel electrode 9 through the gate insulating film 13 and the contact hole 32 that is open in the first interlayer insulating film 14. The pixel electrode 9 is electrically connected to the drain relay wiring 7 through a contact hole 33 that is open in a second interlayer insulating film 15.

On the lower layer side of the pixel electrode 9, a capacitor electrode 71 is formed through a capacitor insulating film 72. In other words, the accumulation capacitor 70 is formed by pinching a capacitor insulating film 72 between the pixel electrode 9 and the capacitor electrode 71. By arranging the accumulation capacitor 70 integrally with the pixel electrode 9 as described above, the voltage of the pixel electrode 9 can be maintained for a time, for example, that is longer than the application time of the image signal by a triple digit figure. As a result, the maintenance characteristic of the liquid crystal element is improved. Therefore, a liquid crystal device with a high contrast ratio can be achieved.

According to this embodiment, in particular, both the pixel electrode 9 and the capacitor electrode 71 are formed from ITO. ITO is a conductive material which is transparent. Accordingly, by using ITO for the pixel electrode disposed in an opening area of the image displaying area 10a or the capacitor electrode 71 that is formed on the lower layer side of the pixel electrode, an image signal can be delivered well without decreasing the transmittance of the liquid crystal device, whereby image display with high quality can be achieved. In addition, the manufacturing process of the liquid crystal device can be simplified by the forming of the capacitor electrode 71 from the same material as that of the pixel electrode 9. In addition, the occurrence of electric erosion at the time of manufacture due to conductive materials having different ionization tendencies coming into contact with each other can be prevented.

ITO has a relatively high resistance value compared to metal materials such as aluminum. Thus, when ITO is used for an element requiring a high-speed operation, there may be a delay in the propagation of an electric signal. However, such a problem does not occur when ITO is used for the capacitor electrode 71 that does not require a high speed operation.

Figure 6:
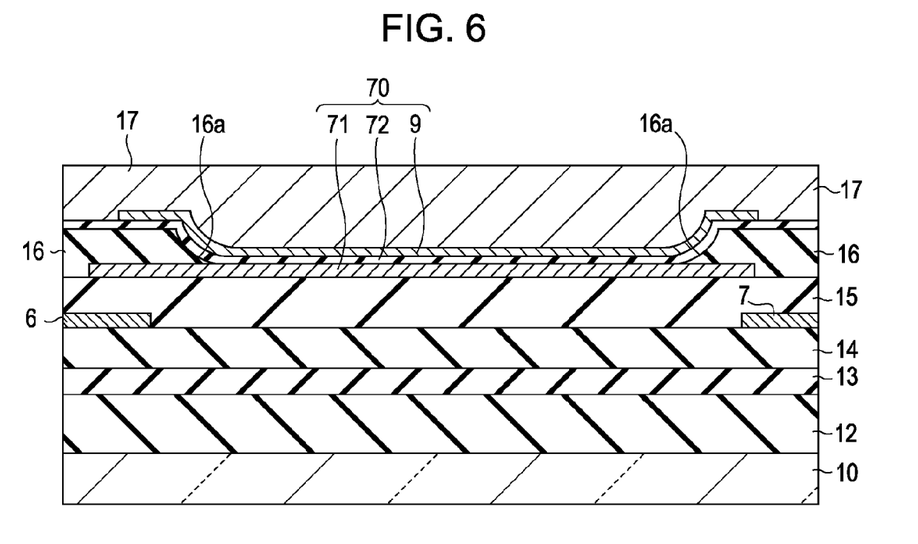
FIG. 6 is a cross-sectional view taken along line VI-VI shown in FIG. 4.

Next, the stacked structure of a cross section taken along line VI-VI shown in FIG. 4 will be described in detail with reference to FIG. 6.

On the TFT array substrate 10, the underlying insulating film 12, the gate insulating film 13, and the first interlayer insulating film 14 are stacked. In addition, on top of the first interlayer insulating film 14 there is the data line 6 to which an image signal is supplied, and the drain relay wiring 7 that relays and connects between the drain region 30a3 and the pixel electrode 9.

Here, the accumulation capacitor 70 is formed on the second interlayer insulating film 15 by pinching the capacitor insulating film 72 between the capacitor electrode 71 and the pixel electrode 9 which together form one pair of electrodes facing each other. In addition, the capacitor electrode 71 is electrically connected to a common electric potential line 300 so as to be maintained at the common electric potential LCCOM (see FIG. 3).

A third interlayer insulating layer 16 that is stacked on the capacitor electrode 71 corresponds to an "insulating film" according to an embodiment of the invention. In particular, according to this embodiment, a part of the third interlayer insulating film 16 is removed, so that a part of the capacitor electrode 71 is exposed on the TFT array substrate 10 in the plan view. In particular, an edge portion of the third interlayer insulating film 16, which remains near an area in which the third interlayer insulating film 16 is removed, is formed so not to be vertically steep but to have a tilted face 16a that is tilted with respect to the surface of the TFT array substrate 10. In addition, as shown in FIG. 6, the tilted face 16a is formed in a curved-face shape. However, it is preferable that the curvature of the tilted face 16a is appropriately adjusted in accordance with the angle of incident light.

According to this embodiment, in particular, both the pixel electrode 9 and the capacitor electrode 71 are formed from ITO. ITO is a conductive material which is transparent. Accordingly, by using ITO for the pixel electrode disposed for each pixel or the capacitor electrode 71 that is formed on the lower layer side of the pixel electrode, an image signal can be delivered well without decreasing the transmittance of the liquid crystal device, whereby image display with high quality can be achieved.

On the third interlayer insulating film 16 and the capacitor electrode 71, a capacitor insulating film 72 is stacked along the surface of the third interlayer insulating film 16 and the capacitor electrode 71. In addition, on the upper layer side of the capacitor insulating film 72, a pixel electrode 9 is additionally formed. The capacitor insulating film 72, for example, is formed to have a single-layer structure or a multiple-layer structure formed of a silicon dioxide ($SiO_2$) film such as an HTO (high temperature oxide) film, an LTO (low temperature oxide) film, a silicon nitride (SiN) film or the like. The capacitor insulating film 72, that is the base of the pixel electrode 9, is formed along the third interlayer insulating film 16 and the surface of the capacitor electrode 71 formed on the third interlayer insulating film 16. On the pixel electrode 9, an alignment film 17 that is used for regulating the alignment of the liquid crystal 50 is stacked, and a rubbing process is performed on the surface of the alignment film 17.

By forming the accumulation capacitor 70 as described above, the electric potential maintaining characteristic of the pixel electrode 9 is improved, and the improvement of the display characteristics, such as improved contrast or decreased flickers, can be achieved. In addition, the accumulation capacitor 70 is formed by the pixel electrode 9 and the capacitor electrode 71, the configuration of the device can be simplified, for example, compared to the case where the accumulation capacitor is formed by arranging an upper electrode and a lower electrode other than the pixel electrode 9. In addition, the capacitor electrode 71 is arranged on the lower layer side relative to the pixel electrode 9. Accordingly, the capacitor electrode 71 can also serve as a shield layer that prevents electrical or electromagnetic coupling between the pixel electrode 9 and the lower layer side (for example, the data line 6 or the like) of the capacitor electrode 71. Therefore, the possibility that an electric potential variation or the like occurs in the pixel electrode 9 can be decreased.

Figure 7A:
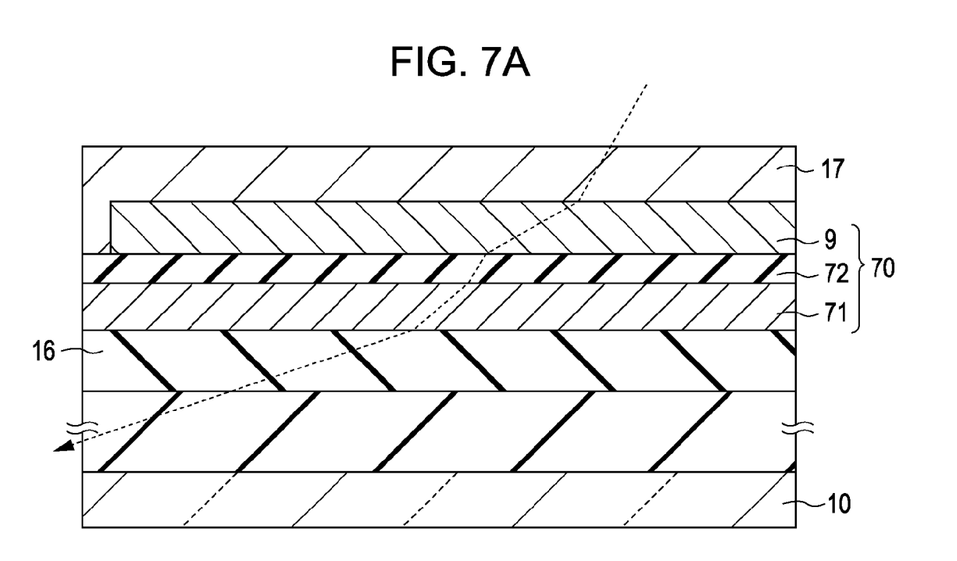
FIGS. 7A and 7B are cross-sectional views schematically showing stacked structures near pixel electrodes of liquid crystal devices according to the embodiment and a comparative example.
Figure 7B:
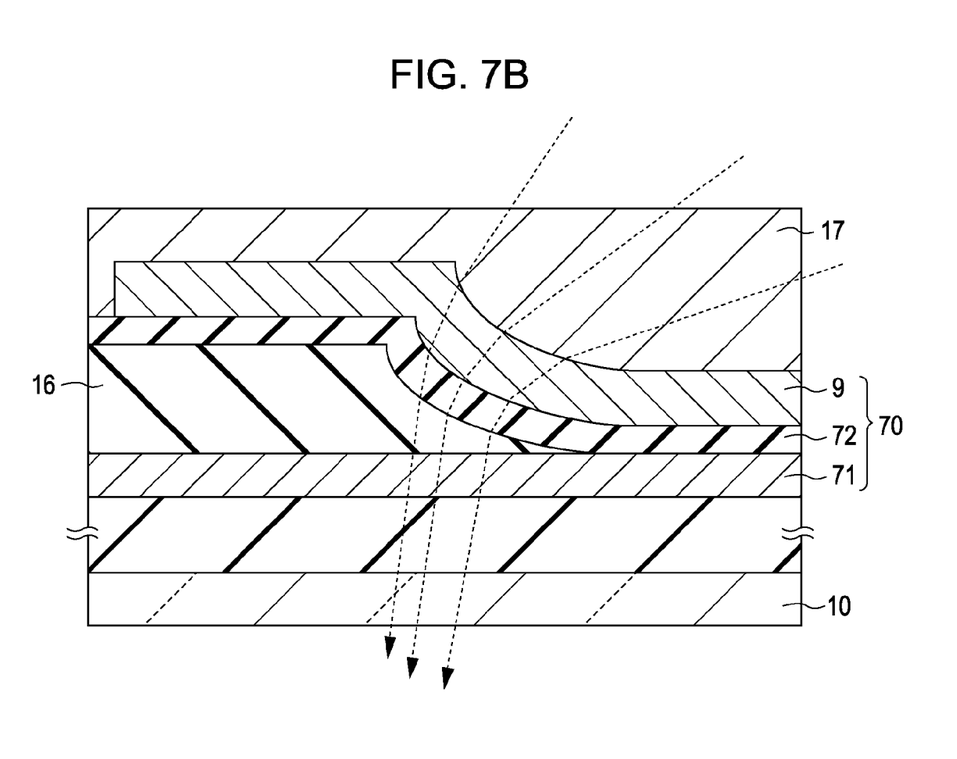

Here, the advantage and the function of the tilted face 16a that is formed on the third interlayer insulating film will de described in more details with reference to FIGS. 7A and 7B.

FIG. 7A is a schematic diagram on the enlarged scale showing the stacked structure near the pixel electrode 9 of a general liquid crystal device (hereinafter, referred to as a comparative example) that does not include any tilted face 16a in the third interlayer insulting film 16. FIG. 7B is a schematic diagram on the enlarged scale showing the stacked structure near the pixel electrode 9 of the liquid crystal device according to this embodiment. In both FIGS. 7A and 7B, in order to size the layers and members to be recognizable in the figures, the scales for each of the layers and members are differently set and a part of the detailed structure is omitted.

First as shown in FIG. 7A, according to the comparative example, the third interlayer insulating film 16, the capacitor insulating film 72, and the pixel electrode 9 are stacked in a direction parallel to the surface of the TFT array substrate 10. Accordingly, tilted light travelling at a direction so as to be tilted with respect to the TFT array substrate 10 is refracted each time it passes through each layer, and as the dotted line in the figure shows, is finally output as light advancing in a more tilted direction (that is, the horizontal direction) compared to the incident angle of the tilted light. As a result, the output light can be easily penetrated into a non-opening area (that is, an area occupied by the data line 6 and the scanning line 11 in FIG. 4). Accordingly, light is irradiated onto the semiconductor layer 30a of the TFT 30 that is disposed in the non-opening area, and an optical leakage current may be easily generated in the semiconductor layer (in particular, the channel region 30a2).

On the other hand, as shown in FIG. 7B, according to this embodiment, the shapes of the capacitor insulating film 72 and the pixel electrode 9 that are stacked on the upper layer side are changed by forming the tilted face 16a in the third interlayer insulating film 16. As described above, by forming the third interlayer insulating film 16, the capacitor insulating film 72, and the pixel electrode 9, as denoted by the dotted line shown in the figure, the tilted light travelling in a direction so as to be tilted with respect to the TFT array substrate 10 is refracted each time it passes through each layer. Then, finally, the tilted light becomes light that travels such that the output direction thereof becomes closer to a direction perpendicular to the TFT array substrate 10 than the incident direction, and is transmitted. In other words, the travelling direction of the tilted light can be changed so as to be closer to the direction perpendicular to the TFT array substrate 10, and accordingly, penetration of the tilted light into the non-opening area can be suppressed.

In particular, according to this embodiment, the pixel electrode 9, the capacitor electrode 71, and the third interlayer insulating film 16 are formed from materials that have different refractive indices. In other words, the tilted light is refracted based on the difference of the refractive indices of the materials of the layers. In addition, the refraction angle of the tilted light can be controlled by adjusting the refractive indices of the materials forming the pixel electrode 9, the capacitor electrode 71, and the third interlayer insulating film 16. Accordingly, it is preferable that the tilted face is set such that the tilted light incident from various angles does not penetrated into the non-opening area by selecting the refractive indices of the materials forming the pixel electrode 9, the capacitor electrode 71, and the third interlayer insulating film 16 in advanced consideration of the direction of the incident light.

In addition, as the comparative example shown in FIG. 7A, in the general liquid crystal device in which a tilted face is not arranged in the insulating film, tilted light incident to the non-opening area disappears or is reflected by the light shielding film or the like, and accordingly, the above-described tilted light does not contribute to the image display. On the other hand, according to this embodiment shown in FIG. 7B, by refracting the tilted light by the tilted face, the tilted light is transmitted to the other side of the TFT array substrate 10, and accordingly, the tilted light can be used as a part of display light. In other words, according to this embodiment, by refracting the tilted light so as to be a part of the display light, the transmittance of the liquid crystal device can be improved.

In addition, according to this embodiment, the capacitor electrode 71 is formed of ITO that is the same as the material of the pixel electrode 9 on the lower layer side of the third interlayer insulating film. Even when the capacitor electrode 71 is not arranged, the incident light incident to pixel electrode 9, the capacitor insulating film 72, and the third interlayer insulating film in the same manner is refracted by each layer, and accordingly, the travelling direction of the tilted light can be changed to be closer to the direction perpendicular to the TFT array substrate 10.

Figure 8:
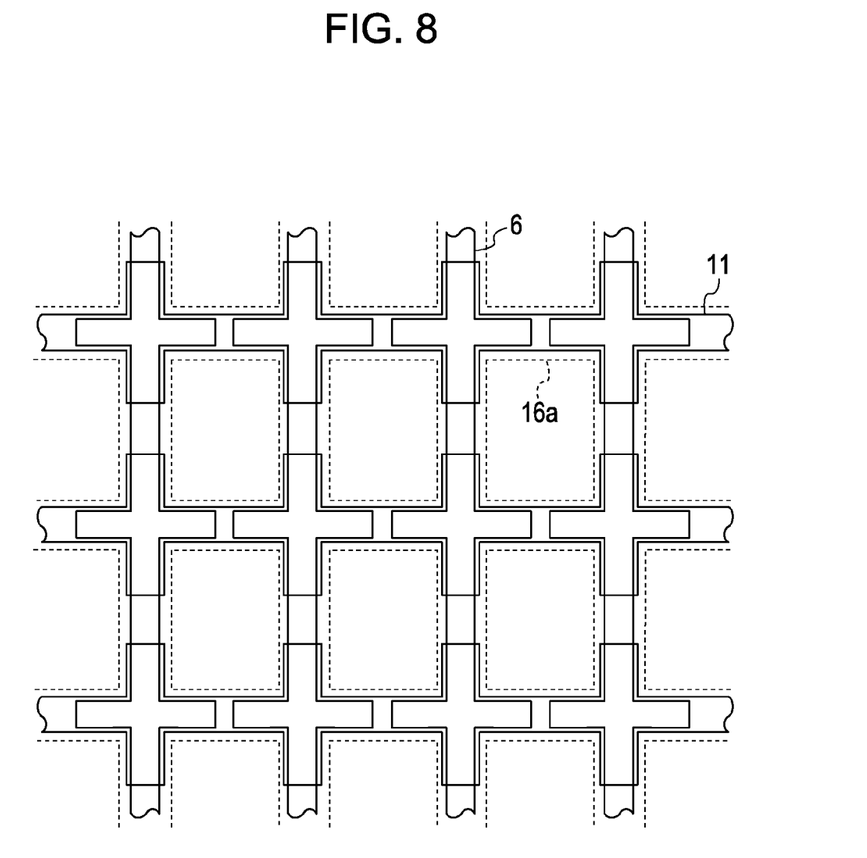
FIG. 8 is a schematic planar diagram showing distribution of tilted faces on a substrate of a liquid crystal device according to the embodiment.

Next, the formation range of the tilted face 16a on the TFT array substrate 10 will be described with reference to FIG. 8. The pixels are partitioned by the data lines 6 and the scanning lines 11. The tilted face 16a, as denoted by the dotted line shown in FIG. 8, is formed in a rectangular shape along the edge of the opening area of each pixel. In other words, the surface of the third interlayer insulating film 16 is formed to have the shape of a bowl with the inner side of the dotted line as its bottom portion for each of the pixels. By forming the tilted face 16a as described above, light which would be penetrated into the non-opening area at a tilted angle can be refracted by the tilted face 16a as described above.

When the tilted face 16a is formed not along the opening area but near the center of the opening area, the tilted light penetrates from an area between the tilted face 16a and the edge portion of the opening area to the non-opening area. Accordingly, an optical leakage current is generated in the TFT located in the non-opening area. Therefore, according to this embodiment, the tilted face 16a is formed along the edge of the opening area.

As described above, according to this embodiment, by arranging the tilted face 16a in the third interlayer insulating film 16, penetration of the tilted light into the non-opening area can be prevented. In addition, by constructively utilizing the tilted light refracted by the tilted face 16a as display light, an electro-optical device having superior transmittance can be achieved.

1-2. Modified Examples

Figure 9A:
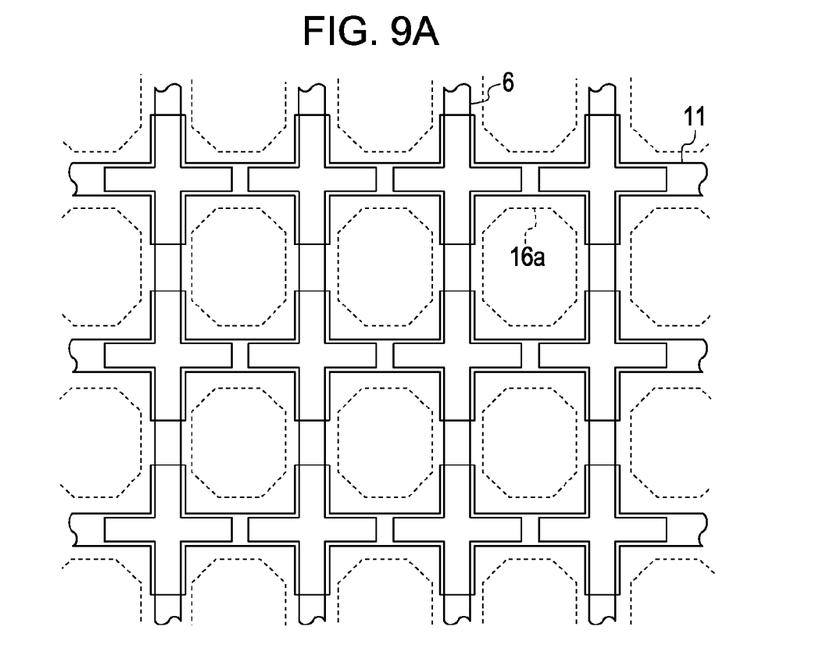
FIGS. 9A and 9B are schematic planar diagrams showing distribution of tilted faces on a substrate of a liquid crystal device according to modified examples of the invention.
Figure 9B:
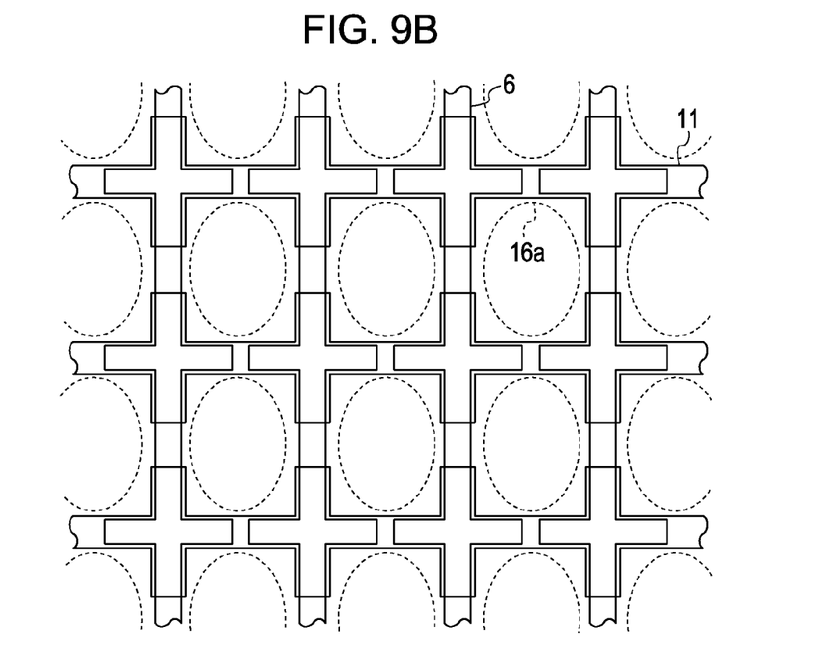

Next, modified examples of this embodiment will be described with reference to FIGS. 9A and 9B. FIGS. 9A and 9B are schematic diagrams showing the formation range of the tilted face 16a that is formed on the surface of the third interlayer insulating film 16 for the pixels partitioned by the data lines 6 and the scanning lines 11. In FIGS. 9A and 9B, the stacked structure, other than that of the capacitor electrode 71, is the same as that of the above-described embodiment.

As shown in FIG. 8, according to the above-described embodiment, the tilted face 16a is formed in a rectangular shape along the edge portion of the opening area for each pixel. According to this modified example, the tilted face 16a is formed to be in a polygonal shape on the TFT array substrate 10 in the plan view in correspondence with the incident direction of the tilted light. For example, as shown in FIG. 9A, by forming the tilted face 16a in a hexagon shape on the TFT array substrate 10 in the plan view for each pixel, tilted light which would be incident at an angle with respect to a direction perpendicular to each side of the hexagon is effectively refracted, and thereby penetration of the above-described tilted light into the non-opening area can be prevented. In addition, as shown in FIG. 9B, by forming the tilted face 16a in a circular shape on the TFT array substrate 10 in the plan view for each pixel, tilted light which would be incident at an angle from any direction is effectively refracted, and thereby penetration of the tilted light into the non-opening area can be prevented. In other words, the circle corresponds to a case where the number of the sides of the polygon is increased infinitely.

However, in a case where the tilted face 16a is formed in the polygon shape or the circular shape, when each pixel has a rectangular shape same as in this modified example, the tilted face 16a is not formed near the corners of each pixel, and accordingly, there is a possibility that tilted light will penetrated into the non-opening area from the corners. Therefore, it is preferable that the incident direction of the tilted light is specified in advance, and the tilted face 16a is formed in an appropriate shape based on the incident direction of the tilted light.

2. Manufacturing Method

Next, a method of manufacturing the above-described liquid crystal device will be described for each process with reference to FIGS. 10A to 10D.

Figure 10A:
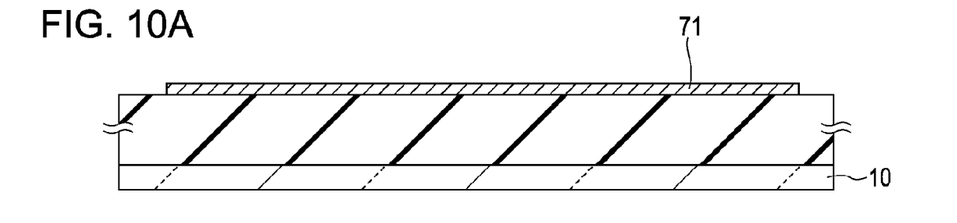
FIGS. 10A to 10D are cross-sectional views showing each process for a method of manufacturing a liquid crystal device according to the embodiment.

First, as shown in FIG. 10A, an underlying layer is stacked on the TFT array substrate 10, and a capacitor electrode 71 is formed evenly on the underlying layer. Here, a TFT, a wiring, and the like may be appropriately arranged between the TFT array substrate 10 and the underlying layer.

Figure 10B:
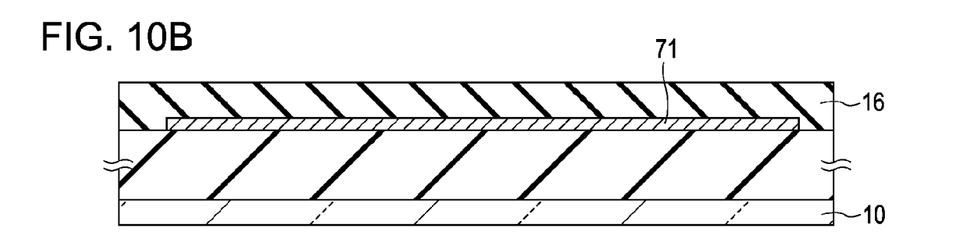

Subsequently, a third interlayer insulating film 16, which has a tilted face 16a according to an embodiment of the invention, is formed on the surface of the capacitor electrode 71. As shown in FIG. 10B, according to this embodiment, the third interlayer insulating film 16 is formed by using a technique such as spin coat, so that the initial surface of the third interlayer insulating film 16 is flat. Alternatively, it may be configured that the third interlayer insulating film 16 is formed by using CVD (chemical vapor deposition) or the like and then is flattened by performing a flattening process such as a CMP (chemical mechanical polishing) process.

Figure 10C:
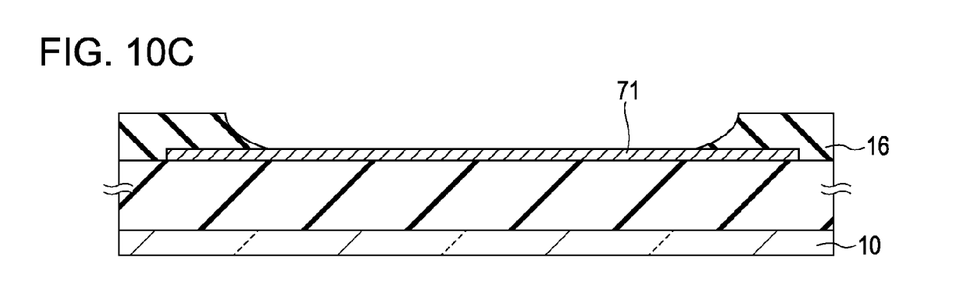

Thereafter, in order to form the tilted face 16a, a mask is formed such that an area near the center of each pixel is open and an area near the periphery of the pixel is covered, and then the third interlayer insulating film is partially removed by performing a wet etching process by using the mask (see FIG. 10C). At this time, by adjusting the time interval or the like of the wet etching process, the film thickness of the third interlayer insulating film to be removed, the degree of tilt of the tilted face 16a with respect to the TFT array substrate 10, the curvature of the tilted face 16a, and the like are adjusted. In FIG. 10C, particularly, in order to form an accumulation capacitor 70 later, the third interlayer insulating film 16 is removed such that the surface of the capacitor electrode 71 is partially exposed.

Figure 10D:
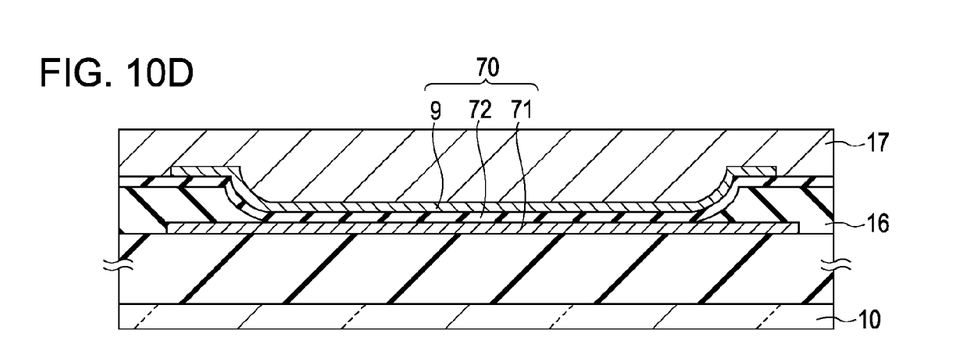

As shown in FIG. 10D, an accumulation capacitor 70 is formed by stacking a capacitor insulating film 72 and a pixel electrode 9 on the third interlayer insulating film 16 and the capacitor electrode 71 by performing CVD, sputtering, or the like. The capacitor insulating film 72, for example, is formed to have a single-layer structure or a multiple-layer structure formed of a silicon dioxide ($SiO_2$) film such as an HTO (high temperature oxide) film, an LTO (low temperature oxide) film, a silicon nitride (SiN) film or the like. In addition, on the upper layer side of the pixel electrode 9, an alignment film 17 is formed that is used for regulating the alignment state of the liquid crystal 50.

The stacked structure on the TFT array substrate 10 is completed by performing the above-described processes. The substrate completed as above is bonded by a sealing member to an opposing substrate 20, in which an opposing electrode 21, an alignment film, and the like are stacked. Then, a liquid crystal 50 is enclosed between the TFT array substrate 10 and the opposing substrate 20, and whereby the above-described liquid crystal device is completed.

Electronic Apparatus

Next, a case of applying a liquid crystal device as the above-described electro-optical device to various kinds of electronic apparatuses will be described.

Figure 11:
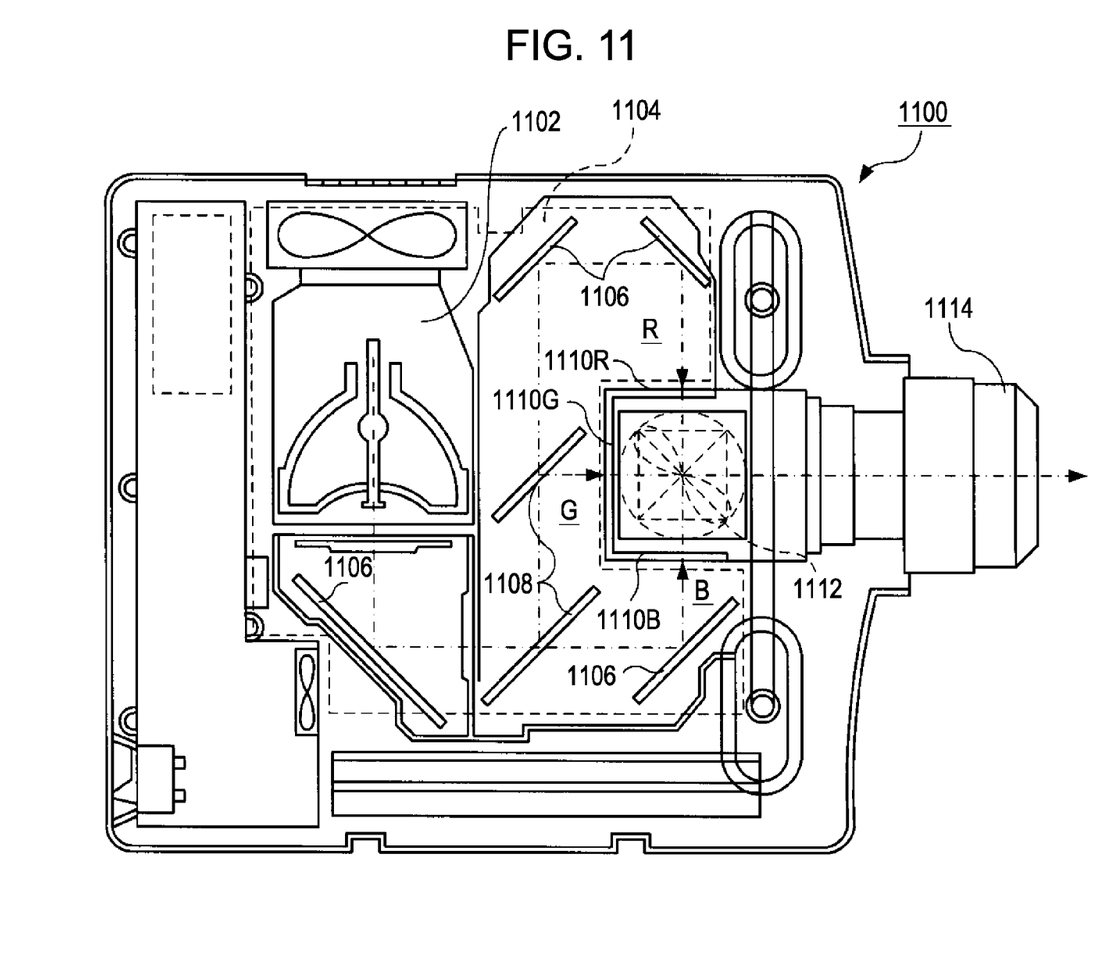
FIG. 11 is a plan view showing the configuration of a projector that is an example of an electronic apparatus in which a liquid crystal device according to the embodiment is used.

FIG. 11 is a plan view illustrating a configuration example of a projector. Hereinafter, a projector using this liquid crystal device as a light valve will be described.

As shown in FIG. 11, a lamp unit 1102 formed of a white light source such as a halogen lamp is provided in a projector 1100. The projecting light outgoing from the lamp unit 1102 is divided into three primary colors of RGB by four sheets of mirror 1106 disposed in a light guide 1104 and two sheets of dichroic mirror 1108, and the divided light enters liquid crystal panels 1110R, 1110B, and 1110G as light valves corresponding to the primary colors.

A configuration of the liquid crystal panels 1110R, 1110B, and 1110G is equivalent to that of the above-described liquid crystal device, and they are driven by primary color signals of R, G, and B colors supplied from an image signal processing circuit. The light modulated by the liquid crystal panels enters a dichroic prism 1112 from 3 directions. In the dichroic prism 1112, the light R and B are reflected by 90°, and the light G goes straight ahead. Accordingly, images of colors are synthesized with each other, and thus a color image is projected onto the screen or the like through a transmission lens 1114.

Focusing on the images displayed by the liquid crystal panels 1110R, 1110B, and 1110G, the image displayed by the liquid crystal panel 1110G is required to be reversed left and right relative to the images displayed by the liquid crystal panels 1110R and 1110B.

The liquid crystal panels 1110R, 1110B, and 1110G are not necessarily provided with color filters since light corresponding to each primary color of R, G, and B is input by the dichroic mirror 1108.

In addition to the electronic apparatus described with reference to FIG. 9, there may be apparatuses such as a mobile personal computer, a mobile phone, a liquid crystal television, a view finder, a monitor direct-view video tape recorder, a car navigation apparatus, a pager, an electronic scheduler, a calculator, a word processor, a work station, a television phone, a POS terminal, and an apparatus including a touch panel. The invention is applicable to these various kinds of electronic apparatuses.

The invention is applicable to a reflective liquid crystal display (LCOS), a plasma display (PDP), a field emission display (FED, SED), an organic EL display, a digital micro mirror device (DMD), an electrophoresis device, and the like, in addition to the liquid crystal device described with reference to the embodiment.

The invention is not limited to the embodiment, and may be variously modified within the technical scope of the invention. In addition, the technical field of the invention also includes an electro-optical device with the modification and an electronic apparatus having the electro-optical device.

The entire disclosure of Japanese Patent Application No. 2008-252535, filed Sep. 30, 2008 is expressly incorporated by reference herein.

What is claimed is:

1. An electro-optical device comprising:
   a base that has a top surface and a bottom surface that is positioned opposite to the top surface;

a liquid crystal layer formed over the top surface of the base;

a pixel arranged in a pixel area on the base, the pixel including a capacitor electrode formed over the top surface of the base, a capacitor insulating film formed over the capacitor electrode, and a pixel electrode formed over a portion of the capacitor insulating film in plan view;

an insulating film formed over a portion of the top surface of the base, the insulating film including a tilted surface that is formed along an edge portion of an opening area of the pixel arranged in the pixel area in plan view, the tilted surface sloping down from an upper layer side of the insulating film toward a lower layer side of the insulating film formed inside of the opening area; and a thin film transistor formed between the insulating film and the top surface of the base, where the thin film transistor electrically connects to the pixel electrode, wherein the pixel electrode and the capacitor insulating film are disposed over the entire tilted surface and at least a portion of the upper layer side of the insulating film, the capacitor electrode is disposed between the top surface of the base and the lower layer side of the insulating film, a refractive index of the insulating film is smaller than a refractive index of the pixel electrode, and the electro-optical device is configured such that at least a portion of a light that transmits through the liquid crystal layer is refracted by the tilted surface of the insulating film, and the portion of the light emerges out from a bottom surface of the electro-optical device.

2. The electro-optical device according to claim 1, wherein the tilted surface of the insulating film has a curved surface with a predetermined curvature in a cross sectional view when viewed from a direction parallel to the top surface of the base.

3. The electro-optical device according to claim 1, wherein:

at least a part of the thin film transistor is disposed so as to overlap with the upper layer side of the insulating film.

4. The electro-optical device according to claim 1, wherein both the capacitor electrode and the pixel electrode are formed to include ITO (indium tin oxide).

5. The electro-optical device according to claim 1, wherein an accumulation capacitor is formed between the capacitor electrode and the pixel electrode in the opening area.

6. The electro-optical device according to claim 1, wherein the lower layer side of the insulating film has a polygon shape in plan view.

7. The electro-optical device according to claim 1, wherein the lower layer side of the insulating film has a circular shape in plan view.

8. An electronic apparatus comprising the electro-optical device according to claim 1.

* * * * *